(12) United States Patent
Yachida et al.

(10) Patent No.: US 11,722,050 B2
(45) Date of Patent: Aug. 8, 2023

(54) CURRENT LIMITING CIRCUIT FOR MULTILEVEL POWER CONVERTER CELL

(71) Applicant: TOSHIBA MITSUBISHI-ELECTRIC INDUSTRIAL SYSTEMS CORPORATION, Chuo-ku (JP)

(72) Inventors: Takayuki Yachida, Chuo-ku (JP); Jumpei Isozaki, Chuo-ku (JP); Taichiro Tsuchiya, Chuo-ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 285 days.

(21) Appl. No.: 17/278,369

(22) PCT Filed: Aug. 9, 2019

(86) PCT No.: PCT/JP2019/031672
§ 371 (c)(1),
(2) Date: Mar. 22, 2021

(87) PCT Pub. No.: WO2021/028975
PCT Pub. Date: Feb. 18, 2021

(65) Prior Publication Data
US 2021/0359588 A1 Nov. 18, 2021

(51) Int. Cl.
*H02M 1/32* (2007.01)
*H02M 1/00* (2006.01)
(Continued)

(52) U.S. Cl.
CPC ......... *H02M 1/007* (2021.05); *H02M 1/0006* (2021.05); *H02M 1/08* (2013.01);
(Continued)

(58) Field of Classification Search
CPC ...... H02M 1/007; H02M 1/0006; H02M 1/32; H02M 1/4208; H02M 1/0048; H02M 7/4835
See application file for complete search history.

(56) References Cited

U.S. PATENT DOCUMENTS

2019/0157968 A1 5/2019 Tsuchiya
2021/0359589 A1* 11/2021 Isozaki ............... H02M 7/4835

FOREIGN PATENT DOCUMENTS

JP 2019092333 A * 6/2019
KR 10-2016-0080021 A 7/2016
(Continued)

OTHER PUBLICATIONS

International Search Report dated Oct. 29, 2019 in PCT/JP2019/031672 filed Aug. 9, 2019.
(Continued)

*Primary Examiner* — Jeffrey A Gblende
*Assistant Examiner* — Jye-June Lee
(74) *Attorney, Agent, or Firm* — Oblon, McClelland, Maier & Neustadt, L.L.P.

(57) ABSTRACT

Each of a plurality of unit converters includes: a main circuit; a control circuit that controls the plurality of switching elements according to a control signal received from the controller; a power supply that lowers a voltage of a first capacitor to generate a power supply voltage and supplies the power supply voltage to the control circuit; and a current-limiting resistance circuit having a variable resistance value and disposed between the main circuit and the power supply. The power supply includes a second capacitor, an overcharge suppression circuit, a power supply circuit, and a controller. The controller includes: an overcharge suppression control circuit that controls the overcharge suppression circuit in accordance with a magnitude of a voltage of the second capacitor; and a resistance (Continued)

switching circuit that changes a resistance value of the current-limiting resistance circuit in accordance with a magnitude of a voltage of the first capacitor.

9 Claims, 10 Drawing Sheets

(51) Int. Cl.
  *H02M 1/08* (2006.01)
  *H02M 1/42* (2007.01)
  *H02M 7/483* (2007.01)
(52) U.S. Cl.
  CPC ............ *H02M 1/32* (2013.01); *H02M 1/4208* (2013.01); *H02M 7/4835* (2021.05)

(56) References Cited

FOREIGN PATENT DOCUMENTS

| | | |
|---|---|---|
| WO | WO 2007/025828 A1 | 3/2007 |
| WO | WO 2018/124523 A2 | 7/2018 |
| WO | WO 2018/198331 A1 | 11/2018 |
| WO | WO-2019155522 A1 * | 8/2019 |

OTHER PUBLICATIONS

Supplementary European Search Report dated Mar. 15, 2023, in European Application No. 19 94 1377, 10 pages.

* cited by examiner

CURRENT LIMITING CIRCUIT FOR MULTILEVEL POWER CONVERTER CELL

TECHNICAL FIELD

The present invention relates to a power conversion device, and more particularly to a power conversion device configured with a series connection of at least one or more unit converters in a main circuit power supply system.

BACKGROUND ART

In recent years, it has been considered to apply a modular multilevel converter (MMC) to a self-excited reactive power compensation apparatus such as a static synchronous compensator (STATCOM), a direct-current (DC) power transmission system such as a back to back (BTB) system, a motor drive inverter, and the like (for example, see WO2007/025828 (PTL 1)).

The MMC is configured with a plurality of unit converters connected in series. A unit converter includes a main circuit that includes a switching element and a DC capacitor. The switching element in the unit converter performs a switching operation to thereby output the voltage across the DC capacitor to an output terminal. As a switching element, a semiconductor switching element such as an insulated gate bipolar transistor (IGBT) capable of controlling conduction/non-conduction is generally used.

In addition to the main circuit, the unit converter includes a power supply and a control circuit for controlling the switching element in the main circuit to be conductive/non-conductive in cooperation with a host controller that controls the entire MMC. The power supply supplies a power supply voltage to the control circuit based on the electric power generated in the main circuit. This is referred to as a main circuit power supply system.

Generally, in the MMC configured in this way, the DC voltage across the DC capacitor in the main circuit is stepped down by a current-limiting resistance, thereby generating an input voltage to a power supply. The electric power appropriate to this input voltage is temporarily stored in a capacitor provided inside the power supply. The power supply supplies a power supply voltage, which is obtained by further stepping down this input voltage, to a control circuit.

CITATION LIST

Patent Literature

PTL 1: WO 2007/025828

SUMMARY OF INVENTION

Technical Problem

However, in the range in which the voltage of the DC capacitor in the main circuit is low, there is a problem that the control circuit receives only a small amount of electric power, so that this control circuit cannot be operated. On the other hand, in the range in which the voltage of the DC capacitor in the main circuit is high, there is a problem that surplus power occurs.

Therefore, an object of the present invention is to provide a power conversion device capable of expanding the operating range of a control circuit and reducing surplus power.

Solution to Problem

A power conversion device of the present invention includes: a power converter including an arm that is formed of a series connection of a plurality of unit converters; and a controller that controls the power converter. Each of the unit converters includes: a main circuit including a plurality of switching elements and a first capacitor that is electrically connected between a first DC line and a second DC line; a control circuit that controls the switching elements according to a control signal received from the controller; a power supply that lowers a voltage of the first capacitor to generate a power supply voltage and supplies the power supply voltage to the control circuit; and a current-limiting resistance circuit having a resistance value that is variable. The current-limiting resistance circuit is disposed between the main circuit and the power supply. The power supply includes: a second capacitor electrically connected between the first DC line and the second DC line; an overcharge suppression circuit electrically connected between the first DC line and the second DC line; a power supply circuit that converts a voltage of the second capacitor into the power supply voltage, the power supply circuit being electrically connected between the first DC line and the second DC line; and a control unit. The control unit includes: an overcharge suppression control circuit that controls the overcharge suppression circuit in accordance with a magnitude of the voltage of the second capacitor; and a resistance switching circuit that changes a resistance value of the current-limiting resistance circuit in accordance with a magnitude of the voltage of the first capacitor.

Advantageous Effects of Invention

According to the present invention, the resistance value of the current-limiting resistance circuit is changed in accordance with the magnitude of the voltage of the first capacitor. Accordingly, the operating range of the control circuit can be expanded while surplus power can be reduced.

DESCRIPTION OF EMBODIMENTS

Figure 1:
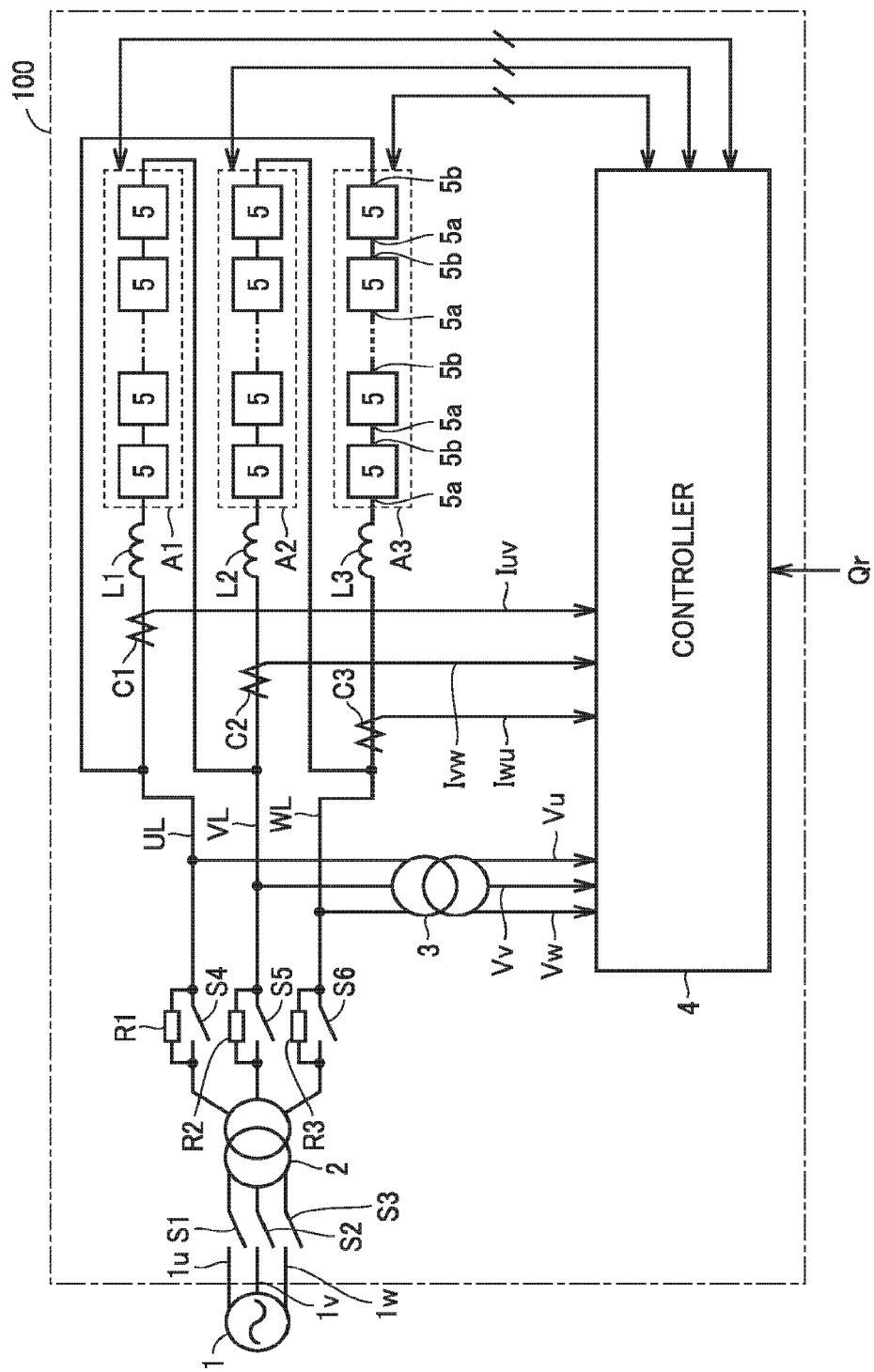
FIG. 1 is a configuration diagram of a power conversion device 100 in an embodiment.

The embodiments will be hereinafter described in detail with reference to the accompanying drawings, in which the same or corresponding components will be designated by the same reference characters, and description thereof will not be repeated.

First Embodiment

FIG. 1 is a configuration diagram of a power conversion device 100 in an embodiment.

Power conversion device 100 is used as a reactive power compensation apparatus configured to compensate for reactive power in an electric power system 1. Referring to FIG. 1, power conversion device 100 includes: arms A1 to A3 each configured with a series connection of at least one or more unit converters 5 in a main circuit power supply system; and a controller 4 configured to control at least one unit converter 5. More specifically, power conversion device 100 includes switches S1 to S6, transformers 2 and 3, current-limiting resistors R1 to R3, alternating-current (AC) lines UL, VL, and WL, current transformers C1 to C3, reactors L1 to L3, arms A1 to A3, and a controller 4.

Switches S1, S2 and S3 each have: one terminal connected to a corresponding one of power transmission lines 1u, 1v, and 1w of three phases in electric power system 1; and the other terminal connected to a corresponding one of three primary windings of transformer 2. Switches S1 to S3 each are in a conductive state under a normal condition, and set in a non-conductive state, for example, during maintenance of power conversion device 100. Transformer 2 includes three primary windings and three secondary windings, and transmits and receives three-phase AC power.

Current-limiting resistors R1, R2 and R3 each have: one terminal connected to a corresponding one of three secondary windings of transformer 2; and the other terminal connected to a corresponding one of AC lines UL, VL, and WL. Current-limiting resistors R1 to R3 each limit a current flowing through a corresponding one of arms A1 to A3 from electric power system 1 when power conversion device 100 is activated.

Switches S4, S5 and S6 are connected in parallel to current-limiting resistors R1, R2 and R3, respectively. Switches S4 to S6 each are set in a conductive state after the current flowing through a corresponding one of arms A1 to A3 is stabilized when power conversion device 100 is activated. Transformer 3 outputs three-phase AC voltages Vu, Vv and Vw of values corresponding to the AC voltages on AC lines UL, VL, and WL, respectively, to controller 4.

Reactor L1 and arm A1 are connected in series between AC line UL and AC line VL. Reactor L2 and arm A2 are connected in series between AC line VL and AC line WL. Reactor L3 and arm A3 are connected in series between AC line WL and AC line UL. In other words, arms A1 to A3 are delta-connected. Arms A1 to A3 are controlled by controller 4 to generate three-phase AC power.

Each of arms A1 to A3 includes a plurality of unit converters 5 that are cascade-connected. Each of the plurality of unit converters 5 generates AC power according to the control signal from controller 4.

A first terminal 5a of unit converter 5 in the first stage of arm A1 is connected to one terminal of reactor L1. In arm A1, a second terminal 5b of each of unit converters 5 other than unit converter 5 in the last stage is connected to a corresponding one of first terminals 5a of unit converters 5 in the subsequent stages. Second terminal 5b of unit converter 5 in the last stage in arm A1 is connected to one terminal of reactor L2.

A first terminal 5a of unit converter 5 in the first stage in arm A2 is connected to one terminal of reactor L2. In arm A2, a second terminal 5b of each of unit converters 5 other than unit converter 5 in the last stage is connected to a corresponding one of first terminals 5a of unit converters 5 in the subsequent stages. Second terminal 5b of unit converter 5 in the last stage in arm A2 is connected to one terminal of reactor L3.

A first terminal 5a of unit converter 5 in the first stage in arm A3 is connected to one terminal of reactor L3. In arm A3, a second terminal 5b of each of unit converters 5 other than unit converter 5 in the last stage is connected to a corresponding one of first terminals 5a of unit converters 5 in the subsequent stages. Second terminal 5b of unit converter 5 in the last stage in arm A3 is connected to one terminal of reactor L1.

Reactors L1, L2 and L3 suppress the circulating currents flowing through arms A1, A2 and A3, respectively. Reactors L1, L2 and L3 may be provided separately from arms A1, A2 and A3, respectively, or may be inductance components of arms A1, A2 and A3, respectively. Current transformers C1, C2 and C3 detect AC currents Iuv, Ivw and Iwu flowing through arms A1, A2 and A3, respectively, and output the detected currents to controller 4.

Controller 4 receives inputs such as a reactive power command value Qr, three-phase AC voltages Vu, Vv and Vw, AC currents Iuv, Ivw and Iwu, and a DC voltage Vdc (which will be described later), and outputs a control signal GC, a gate block signal GB, a gate deblock signal DEB, a conduction command Son and the like (each of which will be described later), to thereby control each of three arms A1 to A3 (that is, each of a plurality of unit converters 5). Reactive power command value Qr is provided, for example, from a center control unit (not shown) in electric power system 1. Power conversion device 100 supplies reactive power of the value corresponding to reactive power command value Qr to electric power system 1.

Figure 2:
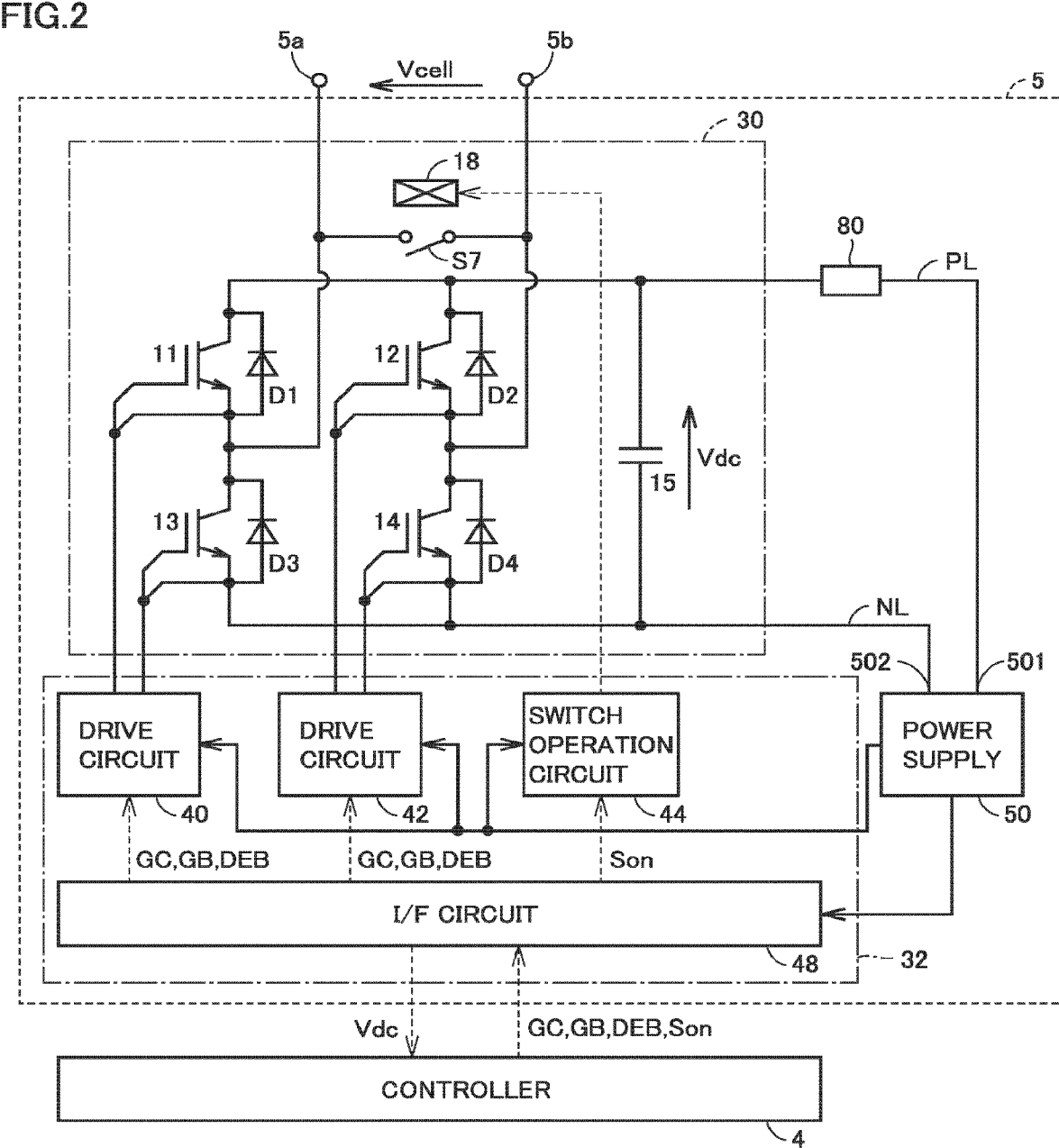
FIG. 2 is a circuit block diagram showing the configuration of a unit converter 5.

FIG. 2 is a circuit block diagram showing the configuration of unit converter 5. Referring to FIG. 2, unit converter 5 includes a main circuit 30, a control circuit 32, a current-limiting resistance circuit 80, and a power supply 50.

Main circuit 30 is formed of a full bridge circuit including a capacitor. Specifically, main circuit 30 has a first terminal 5a and a second terminal 5b. Main circuit 30 includes switching elements 11 to 14, diodes D1 to D4, and a first capacitor 15. Main circuit 30 controls conduction/non-conduction of each of switching elements 11 to 14, to output a voltage pulse having an amplitude corresponding to the voltage across first capacitor 15 between first terminal 5a and second terminal 5b so as to perform power conversion.

Switching elements 11 to 14 each are a self-arc-extinguishing-type power semiconductor element and formed of an IGBT, for example. Switching elements 11 and 13 are connected in series between a first DC line PL and a second DC line NL. Switching elements 12 and 14 are connected in series between first DC line PL and second DC line NL. The collectors of switching elements 11 and 12 are connected to first DC line PL while the emitters of switching elements 13 and 14 are connected to second DC line NL. The connection point between the emitter of switching element 11 and the collector of switching element 13 is connected to first terminal 5a. The connection point between the emitter of switching element 12 and the collector of switching element 14 is connected to second terminal 5b.

Diodes D1, D2, D3, and D4 are connected in anti-parallel with switching elements 11, 12, 13, and 14, respectively. First capacitor 15 is electrically connected between first DC line PL and second DC line NL and stores DC power therein.

In unit converter 5, conduction/non-conduction of each of switching elements 11 to 14 is controlled by control circuit 32. Switching elements 11 and 13 are controlled to be conductive in a manner complementary to each other. Switching elements 12 and 14 are controlled to be conductive in a manner complementary to each other. As shown in FIG. 2, assuming that the voltage to first terminal 5a with respect to second terminal 5b is defined as a cell voltage Vcell, cell voltage Vcell is controlled by conduction/non-conduction of each of switching elements 11 to 14.

Specifically, when each of switching elements 11 and 14 is in a conductive state and when each of switching elements 12 and 13 is in a non-conductive state, cell voltage Vcell is approximately equal to DC voltage Vdc on first capacitor 15. When each of switching elements 11 and 12 is in a conductive state and when each of switching elements 13 and 14 is in a non-conductive state, cell voltage Vcell is approximately zero. When each of switching elements 11 and 12 is in a non-conductive state and when each of switching elements 13 and 14 is in a conductive state, cell voltage Vcell is approximately zero. When each of switching elements 11 and 14 is in a non-conductive state and when each of switching elements 12 and 13 is in a conductive state, cell voltage Vcell is approximately equal to the voltage that is obtained by inverting the polarity of DC voltage Vdc on first capacitor 15.

The entire voltage on arms A1 to A3 is represented by the sum of cell voltages Vcell on unit converters 5 included in each of corresponding arms A1 to A3. Accordingly, the entire voltage on arms A1 to A3 can be controlled by conduction/non-conduction of each of switching elements 11 to 14 forming each of unit converters 5.

Main circuit 30 further includes a switch S7. Switch S7 is connected between first terminal 5a and second terminal 5b. Switch S7 is closed according to conduction command Son from control circuit 32 so as to allow short-circuiting of first terminal 5a and second terminal 5b.

Control circuit 32 includes drive circuits 40 and 42, a switch operation circuit 44, and an interface (I/F) circuit 48. Control circuit 32 is configured to control each of switching elements 11 to 14 to be conductive/non-conductive according to the control signal received from controller 4.

I/F circuit 48 communicates with controller 4 by wire (not shown) or wirelessly. From controller 4, I/F circuit 48 receives control signal GC for controlling the full bridge circuit in main circuit 30. From controller 4, I/F circuit 48 further receives gate block signal GB for fixing each of switching elements 11 to 14 forming a full bridge circuit in a non-conductive state. More specifically, when each of switching elements 11 to 14 is fixed in a non-conductive state, gate block signal GB is activated to an H level. As gate block signal GB is activated to an H level, gate deblock signal DEB is deactivated to an L level. From controller 4, IF circuit 48 receives gate deblock signal DEB for canceling fixation of the non-conductive states of switching elements 11 to 14 that form a full bridge circuit. More specifically, when fixation of the non-conductive states of switching elements 11 to 14 is cancelled, gate deblock signal DEB is activated to an H level. As gate deblock signal DEB is activated to an H level, gate block signal GB is deactivated to an L level. I/F circuit 48 outputs the received control signal GC, gate block signal GB and gate deblock signal DEB to drive circuits 40 and 42.

In response to control signal GC, drive circuit 40 controls conduction/non-conduction of each of switching elements 11 and 13. In response to gate block signal GB, drive circuit 40 fixes each of switching elements 11 and 13 in a non-conductive state (a deactivated state or a gate block state). In response to gate deblock signal DEB, drive circuit 40 cancels fixation of the non-conductive states of switching elements 11 and 13 (to be in a non-gate block state or in a gate deblock state).

In response to control signal GC, drive circuit 42 controls conduction/non-conduction of each of switching elements 12 and 14. In response to gate block signal GB, drive circuit 42 fixes each of switching elements 12 and 14 in a non-conductive state (a deactivated state or a gate block state). In response to gate deblock signal DEB, drive circuit 42 cancels fixation of the non-conductive states of switching elements 12 and 14 (to be in a non-gate block state or in a gate deblock state).

In other words, when gate block signal GB is at an H level and gate deblock signal DEB is at an L level, switching elements 11 to 14 each are set in a gate block state. When gate block signal GB is at an L level and gate deblock signal DEB is at an H level, switching elements 11 to 14 each are set in a non-gate block state.

Controller 4 may simultaneously control the level of gate block signal GB and the level of gate deblock signal DEB to each of unit converters 5 in arm A1. Thereby, switching elements 11 to 14 in each of unit converters 5 in arm A1 are simultaneously set in non-conductive states, and also, fixation of the non-conductive states of switching elements 11 to 14 is simultaneously canceled. The same also applies to arms A2 and A3.

Switch operation circuit 44 serves as a circuit for operating switch S7. Switch operation circuit 44 controls power conduction to an exciting coil 18 according to a command from controller 4. During the normal operation, current supply to exciting coil 18 is stopped, so that switch S7 is brought into a non-conductive state. On the other hand, when controller 4 detects an abnormality such as a short-circuit fault in any of switching elements 11 to 14 in one unit converter 5 of the plurality of unit converters 5, controller 4 outputs conduction command Son for switch S7 to this one unit converter 5 having such a fault. In unit converter 5 having a fault, I/F circuit 48 receives conduction command Son and outputs the received conduction command Son to switch operation circuit 44. In response to conduction command Son, switch operation circuit 44 supplies a current to exciting coil 18, to thereby set switch S7 in a conductive state. Accordingly, the output of unit converter 5 having a fault is short-circuited.

Current-limiting resistance circuit 80 is interposed in first DC line PL between main circuit 30 and power supply 50. Current-limiting resistance circuit 80 lowers DC voltage Vdc of first capacitor 15.

Power supply 50 includes input terminals 501 and 502. Input terminal 501 is connected to first DC line PL. Input terminal 502 is connected to second DC line NL. Power supply 50 is electrically connected in parallel to first capacitor 15. Power supply 50 lowers the voltage of first capacitor 15 to generate a power supply voltage and supplies the power supply voltage to control circuit 32. Thereby, unit converter 5 forms a cell of a self-contained type, which is capable of supplying electric power from main circuit 30 to control circuit 32.

Then, the summary of the normal operation of power conversion device 100 will be described.

Based on AC currents Iuv, Ivw, and Iwu from current transformers C1, C2 and C3, respectively, controller 4 calculates three-phase AC currents Iu, Iv, and Iw of the levels corresponding to the AC currents flowing through AC lines UL, VL, and WL, respectively. It is to be noted that Iu=Iuv−Iwu, Iv=Ivw−Iuv, and Iw=Iwu−Ivw.

Controller 4 calculates reactive power Q0 based on three-phase AC voltages Vu, Vv, and Vw from transformer 3 and three-phase AC currents Iu, Iv, and Iw from a computing unit 31. Controller 4 calculates a deviation ΔQ between reactive power command value Qr and reactive power Q0 (ΔQ=Qr−Q0).

Based on AC currents Iuv, Ivw and Iwu from current transformers C1, C2 and C3, respectively, and three-phase AC voltages Vu, Vv and Vw from transformer 3, and the like, controller 4 generates a plurality of voltage command values Vdcr corresponding to their respective unit converters 5.

Controller 4 calculates a deviation ΔVdc between voltage command value Vdcr and DC voltage Vdc. Controller 4 performs the control operation for setting voltage deviation ΔVdc to be zero and for setting reactive power deviation ΔQ to be zero, to thereby generate three-phase AC voltage command values Vuvr, Vvwr, and Vwur.

In other words, controller 4 performs active current control for each unit converter 5 such that voltage deviation ΔVdc becomes zero and also performs reactive current control for each unit converter 5 such that reactive power deviation ΔQ becomes zero.

Based on three-phase AC voltage command values Vuvr, Vvwr and Vwur, each of unit converters 5 in each of arms A1 to A3 is operated, and thus, DC voltage Vdc becomes equal to voltage command value Vdcr while reactive power Q0 becomes equal to reactive power command value Qr. Specifically, for example, according to pulse width modulation (PWM) control, controller 4 generates control signal GC for causing the power conversion device to output the voltage corresponding to each of three-phase AC voltage command values Vuvr, Vvwr, and Vwur. Controller 4 outputs control signal GC to control circuit 32 of each unit converter 5 in each of arms A1 to A3. According to control signal GC, each control circuit 32 controls each of switching elements 11 to 14 to be conductive at a prescribed timing, to thereby convert the DC voltage into an AC voltage.

Reference Example

Figure 3:
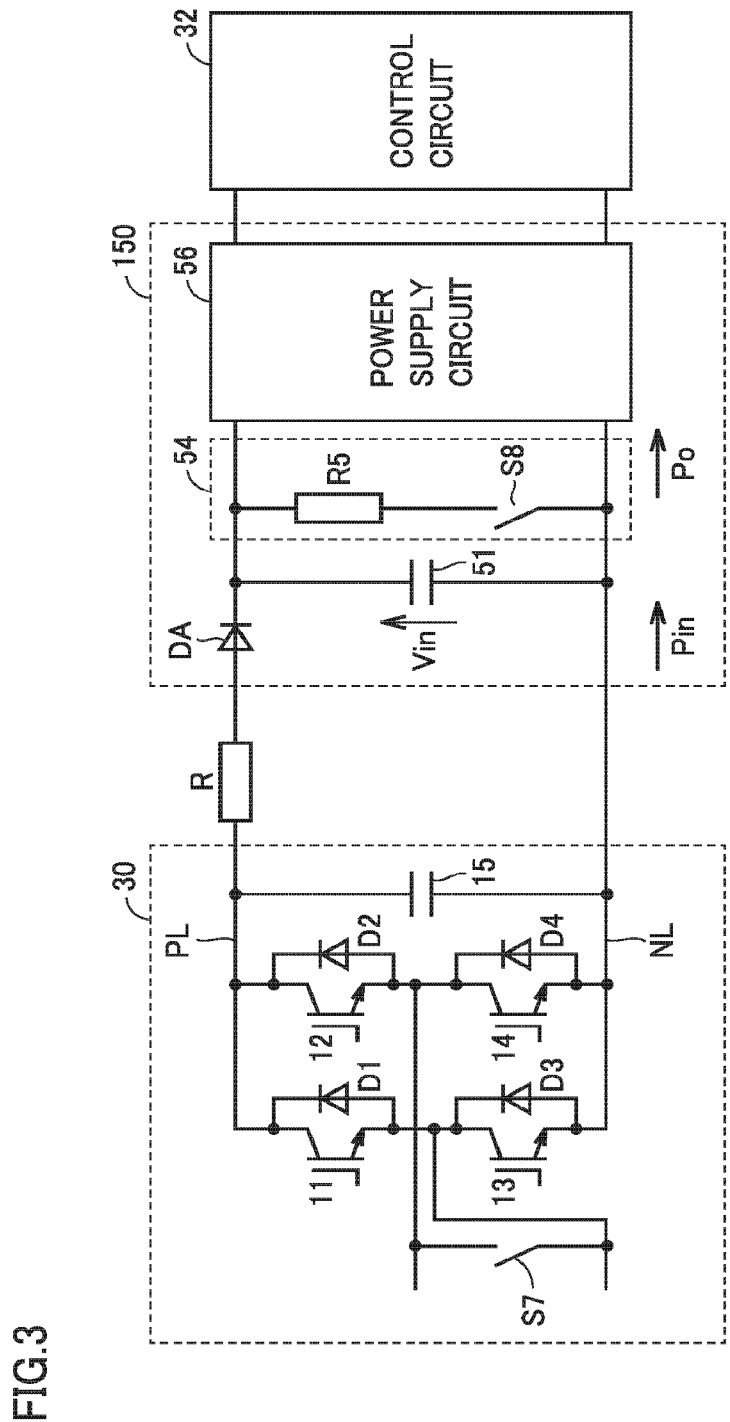
FIG. 3 is a diagram showing the configuration of a unit converter 5 in a reference example.

FIG. 3 is a diagram showing the configuration of unit converter 5 in a reference example.

Unit converter 5 in the reference example includes a power supply 150 in place of power supply 50 in the present embodiment, and a current-limiting resistance R in place of current-limiting resistance circuit 80 in the present embodiment.

Power supply 150 includes a second capacitor 51 and an overcharge suppression circuit 54.

Second capacitor 51 is connected between first DC line PL and second DC line NL. Overcharge suppression circuit 54 includes a resistance R5 and a switch S8 that are connected in series between first DC line PL and second DC line NL. Second capacitor 51 receives electric charge from first capacitor 15 through current-limiting resistance R. Power supply 150 supplies electric power to control circuit 32.

In this case, the sum of the load power of control circuit 32 and the loss power occurring in power supply 150 is defined as Po. Po is required power. The resistance value of current-limiting resistance R is defined as R, the DC voltage of first capacitor 15 is defined as Vdc, and the input voltage into second capacitor 51 is defined as Vin. In this case, supply power PIN from main circuit 30 to power supply 150 is represented by the following equation.

$$\text{PIN}=(Vdc-Vin)/R*Vin \qquad (1)$$

In order to maintain the power supply to control circuit 32, the relation of PIN≥Po needs to be satisfied. In the case where PIN=Po, an input voltage Vin is kept at a constant value. In the case where PIN>Po, second capacitor 51 is overcharged by surplus power (PIN−Po). Input voltage Vin is limited depending on the configuration of the internal circuit in power supply 150, and the average value of input voltages Vin needs to be approximately constant. Thus, resistance R5 in overcharge suppression circuit 54 provided in parallel with second capacitor 51 consumes surplus power, so as to keep input voltage Vin at an approximately constant value. In the case where PIN<Po, the electric power required by control circuit 32 is not supplied to control circuit 32.

DC voltage Vdc of first capacitor 15 changes in a prescribed range in accordance with the operating state of main circuit 30.

Figure 4:
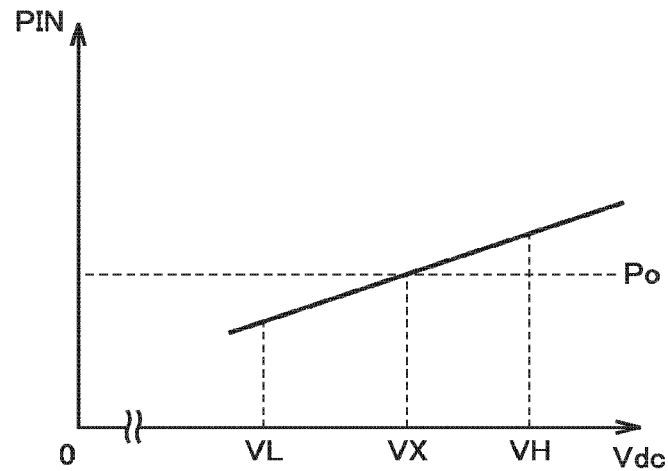
FIG. 4 is a diagram showing the relation between a DC voltage Vdc and supply power in the case where a current-limiting resistance R has a resistance value of α.
Figure 5:
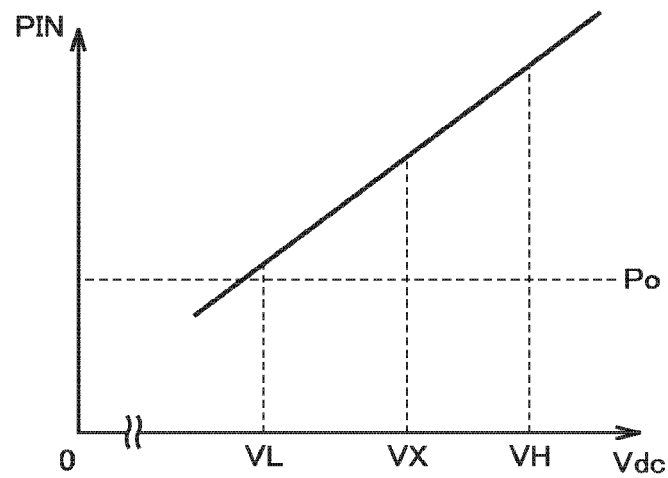
FIG. 5 is a diagram showing the relation between DC voltage Vdc and supply power PIN in the case where current-limiting resistance R has a resistance value of β (<α).

FIG. 4 is a diagram showing the relation between DC voltage Vdc and supply power PIN in the case where current-limiting resistance R has a resistance value of α. FIG. 5 is a diagram showing the relation between DC voltage Vdc and supply power PIN in the case where current-limiting resistance R has a resistance value of β (<α).

As shown in FIG. 4, supply power PIN changes as DC voltage Vdc changes from a lower limit voltage VL to an upper limit voltage VH. When DC voltage Vdc is equal to or greater than Vx, supply power PIN is equal to or greater than required power Po. When DC voltage Vdc is less than Vx, supply power PIN is less than required power Po. Accordingly, when DC voltage Vdc is less than Vx, the electric power required by control circuit 32 is not supplied to control circuit 32. In order to supply electric power required by control circuit 32 also at a small DC voltage Vdc, the resistance value of current-limiting resistance R only has to be lowered.

As shown in FIG. 5, when the resistance value of current-limiting resistance R is lowered, supply power PIN with respect to DC voltage Vdc largely changes. Even when DC voltage Vdc is at lower limit voltage VL, supply power PIN is equal to or greater than required power Po. However, when DC voltage Vdc rises, the excess of supply power PIN with respect to required power Po increases. When supply power PIN is larger than required power Po, input voltage Vin can still be kept at an approximately constant value by the above-mentioned function of the overcharge suppression circuit, but power loss in resistance R5 increases.

In the present embodiment, the resistance value of current-limiting resistance circuit 80 is changed depending on whether DC voltage Vdc is in a region equal to or greater than Vx or in a region less than Vx. Thereby, power supply can be ensured at low DC voltage Vdc while power loss can be suppressed at high DC voltage Vdc.

Figure 6:
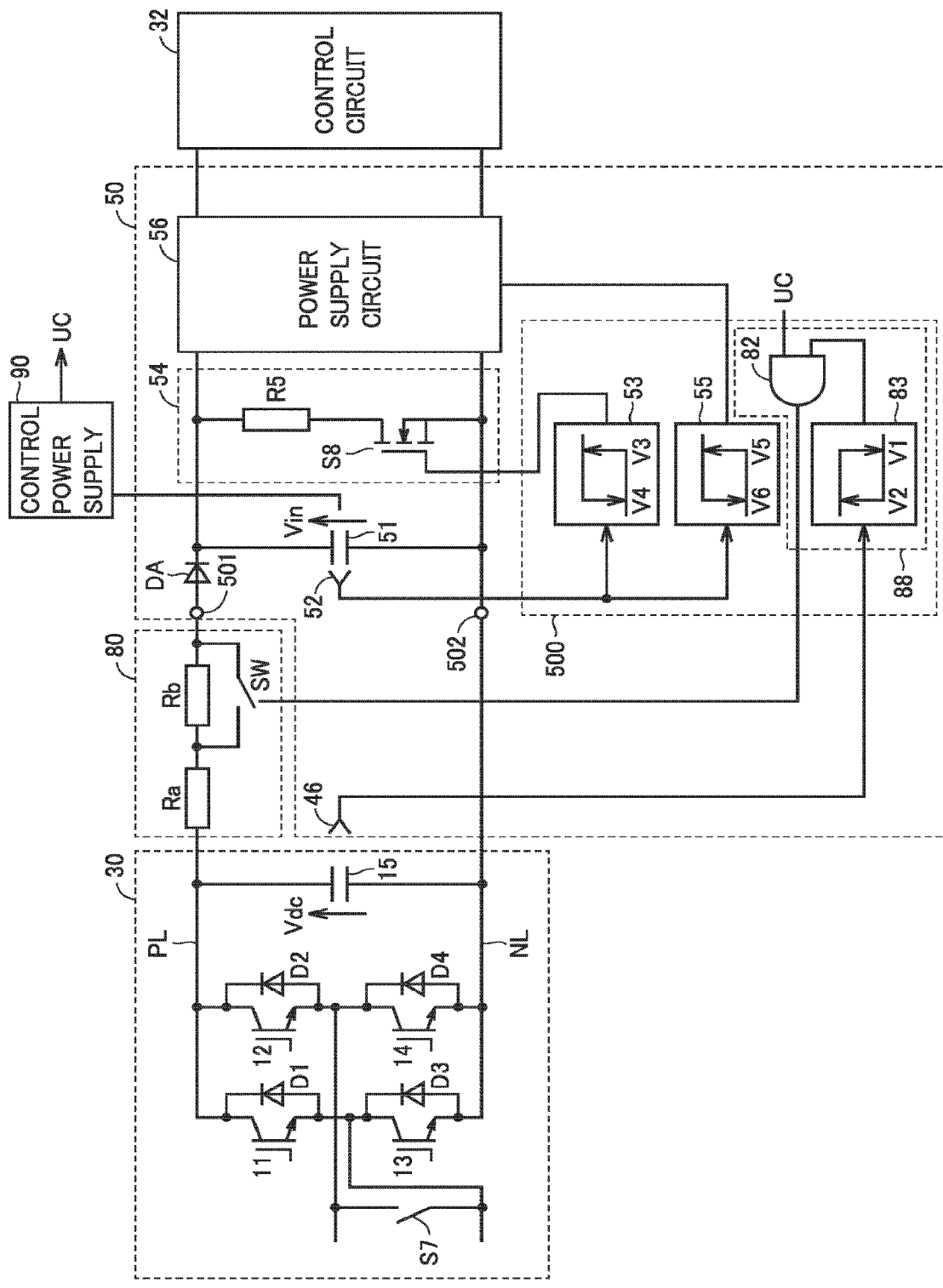
FIG. 6 is a circuit block diagram of a unit converter in the first embodiment.

FIG. 6 is a circuit block diagram of the unit converter in the first embodiment. Referring to FIG. 6, current-limiting resistance circuit 80 includes resistances Ra and Rb and a switch SW. Power supply 50 includes a second capacitor 51, voltage sensors 46 and 52, an overcharge suppression circuit 54, a control unit 500, and a power supply circuit 56. Overcharge suppression circuit 54 includes a switch S8 and a resistance R5.

Resistance Ra and resistance Rb are connected in series on first DC line PL. Resistance Rb and switch SW are connected in parallel. Switch SW is controlled by control unit 500. The resistance value of resistance Ra is defined as Ra. The resistance value of resistance Rb is defined as Rb. When switch SW is on, the resistance of current-limiting resistance circuit 80 is Ra. When switch SW is off, the resistance of current-limiting resistance circuit 80 is (Ra+Rb).

Second capacitor 51 is connected between input terminal 501 on first DC line PL and input terminal 502 on second DC line NL. Second capacitor 51 is configured to generate input voltage Vin by electric power supplied from first capacitor 15 through current-limiting resistance circuit 80.

Power supply circuit 56 is electrically connected between first DC line PL and second DC line NL, and configured to convert the voltage of second capacitor 51 into a power supply voltage.

Voltage sensor 46 detects DC voltage Vdc between the terminals of first capacitor 15, and outputs the detection value to control unit 500. Voltage sensor 52 detects voltage Vin between the terminals of second capacitor 51 (hereinafter referred to as an input voltage) and outputs the detection value to control unit 500.

Switch S8 and resistance R5 are electrically connected in series between first DC line PL and second DC line NL. Switch S8 is controlled by control unit 500 to be conductive/non-conductive. When switch S8 is in a conductive state, a discharge current from second capacitor 51 flows through resistance R5, and input voltage Vin of second capacitor 51 falls. In other words, resistance R5 serves as an overcharge suppression resistance for second capacitor 51. Switch S8 is formed of a transistor, a relay and the like.

When input voltage Vin rises to V7, a control power supply 90 is activated so as to cause power supply 50 to function. As control power supply 90 is activated, a control power supply activation signal UC shifts to an H level.

Based on the detection value of voltage sensor 52, control unit 500 controls switch S8 to be conductive/non-conductive, and also controls power supply circuit 56 to be activated/deactivated. Control unit 500 controls switch SW of current-limiting resistance circuit 80 based on the detection value of voltage sensor 46. Control unit 500 includes an overcharge suppression control circuit 53, an activation/deactivation circuit 55, and a resistance switching circuit 88. Resistance switching circuit 88 includes a voltage detection circuit 83 and an AND circuit 82.

Based on input voltage Vin, overcharge suppression control circuit 53 controls switch S8 to be conductive/non-conductive, so as to suppress overcharging of second capacitor 51. The signal output from overcharge suppression control circuit 53 to switch S8 shifts from an L (logic low) level to an H (logic high) level when the detection value of input voltage Vin becomes equal to or greater than a threshold value V3 while input voltage Vin rises. On the other hand, the signal output from overcharge suppression control circuit 53 to switch S8 shifts from an H level to an L level when the detection value of input voltage Vin becomes equal to or less than threshold value V4 while input voltage Vin falls. In this case, V3>V4.

Switch S8 is controlled to be conductive when the signal output from overcharge suppression control circuit 53 is at an H level. Also, switch S8 is controlled to be non-conductive when the signal output from overcharge suppression control circuit 53 is at an L level.

Activation/deactivation circuit 55 controls power supply circuit 56 to be activated/deactivated based on the detection value of input voltage Vin. The signal output from activation/deactivation circuit 55 to power supply circuit 56 shifts from an L level to an H level when the detection value of input voltage Vin becomes equal to or greater than threshold value V5 while input voltage Vin rises. On the other hand, the signal output from activation/deactivation circuit 55 to power supply circuit 56 shifts from an H level to an L level when the detection value of input voltage Vin becomes equal to or less than threshold value V6 while input voltage Vin falls. In this case, V5>V6.

When the output signal from activation/deactivation circuit 55 shifts from an L level to an H level, power supply circuit 56 is activated to supply a power supply voltage to control circuit 32. Thereby, control circuit 32 is activated. On the other hand, when the output signal from activation/deactivation circuit 55 shifts from an H level to an L level, power supply circuit 56 is deactivated. Thereby, supply of the power supply voltage from power supply circuit 56 to control circuit 32 is stopped to thereby deactivate control circuit 32.

Resistance switching circuit 88 changes the resistance value of current-limiting resistance circuit 80 based on voltage Vdc of first capacitor 15 and control power supply activation signal UC.

The signal output from voltage detection circuit 83 shifts from an H level to an L level when the detection value of DC voltage Vdc becomes equal to or greater than a threshold value V1 (the first threshold value) while DC voltage Vdc rises. On the other hand, the signal output from voltage detection circuit 83 to switch SW shifts from an L level to an H level when the detection value of DC voltage Vdc becomes equal to or less than a threshold value V2 (the second threshold value) while DC voltage Vdc falls. In this case, V1>V2. Threshold value V1 corresponds to Vx in FIGS. 4 and 5 at the time when DC voltage Vdc rises. Threshold value V2 corresponds to Vx in FIGS. 4 and 5 at the time when DC voltage Vdc falls. The magnitudes of threshold values V1 and V2 each range between an initial stable voltage VS at which the voltage of first capacitor 15 is stabilized and a control target voltage VR of first capacitor 15 after power conversion device 100 is activated and before switching elements 11 to 14 perform switching operations.

AND circuit 82 outputs, to switch SW, a signal showing a logical product of the output signal from voltage detection circuit 83 and control power supply activation signal UC.

Switch SW is turned off when control power supply activation signal UC is at an L level. Thereby, the resistance value of current-limiting resistance circuit 80 becomes (Ra+Rb). In other words, control power supply activation signal UC shifts to an H level after input voltage Vin rises to V7. Thus, switch SW remains off until input voltage Vin becomes equal to or greater than V7 after power conversion device 100 is activated.

Switch SW is turned on when control power supply activation signal UC is at an H level and the output signal from resistance switching circuit 88 is at an H level. Thereby, the resistance value of current-limiting resistance circuit 80 becomes Ra. Switch SW is turned off when control power supply activation signal UC is at an H level and the output signal from resistance switching circuit 88 is at an L level. Thereby, the resistance value of current-limiting resistance circuit 80 becomes (Ra+Rb).

Figure 7:
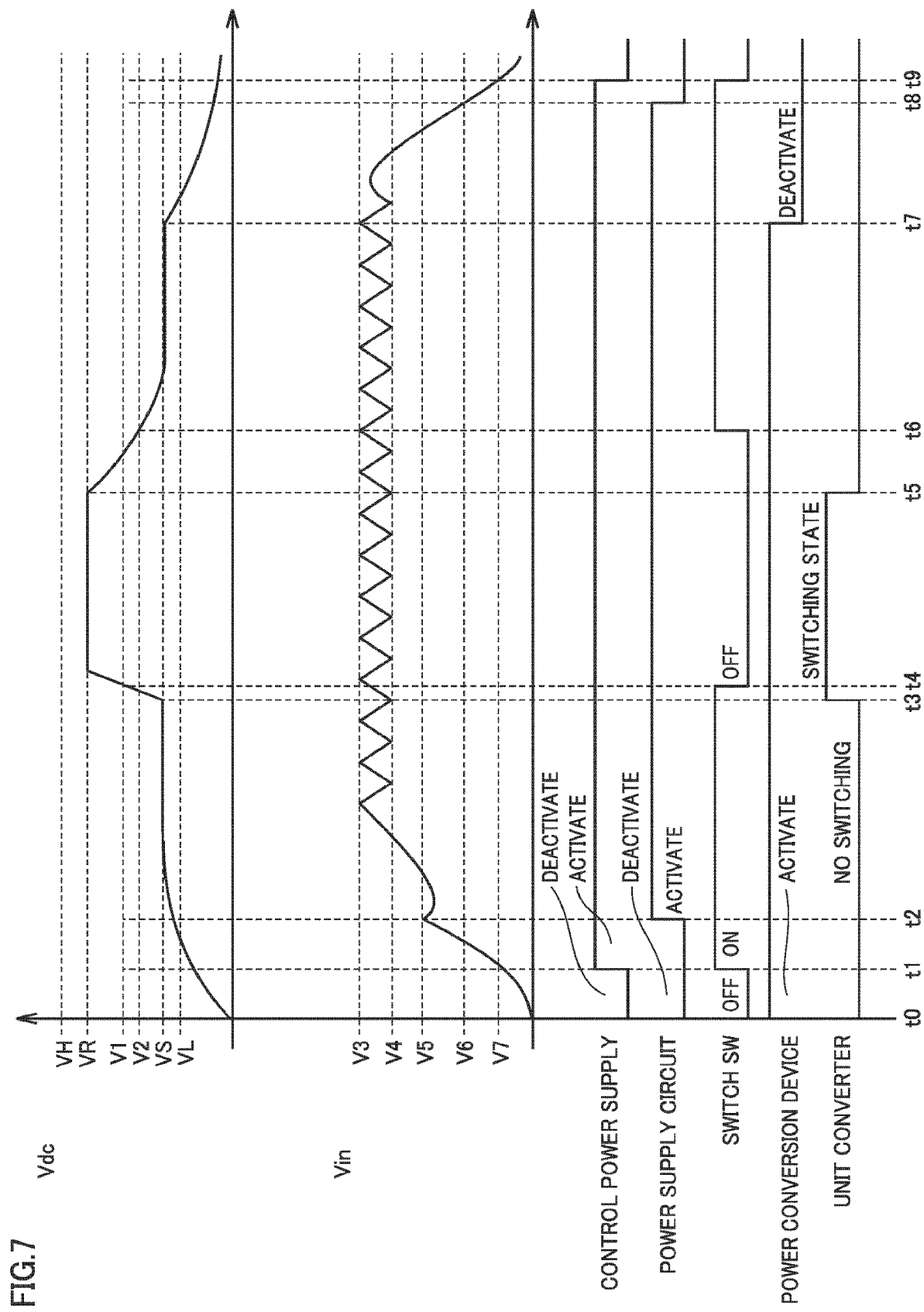
FIG. 7 is a diagram for illustrating the operation of a power supply 50.

FIG. 7 is a diagram for illustrating the operation of power supply 50. DC voltage Vdc changes in a range between lower limit voltage VL and upper limit voltage VH, which corresponds to the operating range of the power conversion device.

At time t0, controller 4 controls switches S1, S2, and S3 to be conductive to thereby activate power conversion device 100. Since switch SW in current-limiting resistance circuit 80 is normally off, the resistance value of current-limiting resistance circuit 80 is (Ra+Rb). In unit converter 5, initial charging of first capacitor 15 is performed, so that DC voltage Vdc of first capacitor 15 rises. Accordingly, second capacitor 51 is charged through resistance Ra and resistance Rb that are connected in series, so that input voltage Vin of second capacitor 51 also rises.

At time t1, when input voltage Vin rises to V7, control power supply 90 for causing power supply 50 to function is activated. As control power supply 90 is activated, control power supply activation signal UC shifts to an H level, and also, voltage sensors 46 and 52, overcharge suppression control circuit 53, activation/deactivation circuit 55, and resistance switching circuit 88 start to operate. Since DC voltage Vdc of first capacitor 15 detected by voltage sensor 46 is equal to or less than V2, resistance switching circuit 88 transmits a signal at an H level (an ON command) to switch SW. Thereby, switch SW is turned on and the resistance value of current-limiting resistance circuit 80 is lowered to Ra.

At time t2, when input voltage Vin rises to V5, activation/deactivation circuit 55 transmits a signal at an H level to power supply circuit 56. Thereby, power supply circuit 56 is activated to supply a power supply voltage to control circuit 32, so that control circuit 32 is activated.

Then, voltage Vdc of first capacitor 15 reaches initial stable voltage VS as a stabilization point in the initial charging state. Initial stable voltage VS is set to be equal to or greater than lower limit voltage VL. At this time, PIN>Po. Thus, overcharge suppression circuit 54 is operated by overcharge suppression control circuit 53, and input voltage Vin is controlled to fall within a range of V3 to V4.

At time t3, controller 4 activates, to an H level, gate deblock signal DEB for canceling fixation of non-conductive states of switching elements 11 to 14. I/F circuit 48 outputs gate deblock signal DEB to drive circuits 40 and 42. In response to gate deblock signal DEB, drive circuit 40 cancels fixation of the non-conductive states of switching elements 11 and 13. In response to gate deblock signal DEB, drive circuit 42 cancels fixation of the non-conductive states of switching elements 12 and 14. Furthermore, in order to set DC voltage Vdc to be equal to control target voltage VR, controller 4 outputs control signal GC for controlling switching elements 11 to 14 to be conductive/non-conductive. I/F circuit 48 outputs control signal GC to drive circuits 40 and 42. In response to control signal GC, drive circuit 40 controls switching elements 11 and 13 to be conductive/non-conductive. In response to control signal GC, drive circuit 42 controls switching elements 12 and 14 to be conductive/non-conductive. Thereby, DC voltage Vdc of first capacitor 15 rises toward control target voltage VR.

When DC voltage Vdc of first capacitor 15 rises to V1 at time t4, resistance switching circuit 88 transmits a signal at an L level (an OFF command) to switch SW. Thereby, switch SW is turned off, and the resistance value of current-limiting resistance circuit 80 increases to (Ra+Rb). As a result, supply power PIN decreases, so that surplus power is suppressed. Voltage Vdc of first capacitor 15 also thereafter rises toward control target voltage VR and reaches control target voltage VR. Then, this voltage Vdc is kept at control target voltage VR.

At time t5, controller 4 activates, to a high level, gate block signal GB for fixing switching elements 11 to 14 in non-conductive states. I/F circuit 48 outputs gate block signal GB to drive circuits 40 and 42. In response to gate block signal GB, drive circuit 40 fixes switching elements 11 and 13 in non-conductive states. In response to gate block signal GB, drive circuit 42 fixes switching elements 12 and 14 in non-conductive states. Thereby, DC voltage Vdc of first capacitor 15 falls from control target voltage VR toward initial stable voltage VS.

When DC voltage Vdc of first capacitor 15 falls to V2 at time t6, resistance switching circuit 88 transmits a signal at an H level (an ON command) to switch SW. Thereby, switch SW is turned on and the resistance value of current-limiting resistance circuit 80 is reduced to Ra. Thereby, supply power PIN increases.

When controller 4 controls switches S1, S2, and S3 to be non-conductive to thereby deactivate power conversion device 100 at time t7, DC voltage Vdc of first capacitor 15 and input voltage Vin fall.

When input voltage Vin falls to V6 at time t8, activation/deactivation circuit 55 transmits a signal at an L level to power supply circuit 56. Thereby, power supply circuit 56 is deactivated to stop supply of the power supply voltage to control circuit 32.

When input voltage Vin falls to V7 at time t9, control power supply activation signal UC shifts to an L level. Thereby, resistance switching circuit 88 transmits a signal at an L level (an OFF command) to switch SW, and control power supply 90 is deactivated. When control power supply 90 is deactivated, the function of power supply 50 is stopped.

Figure 8:
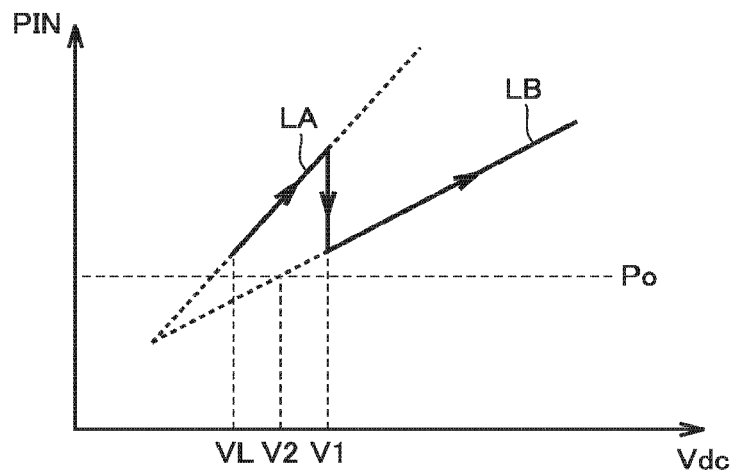
FIG. 8 is a diagram showing a change in supply power PIN as DC voltage Vdc rises in the first embodiment.
Figure 9:
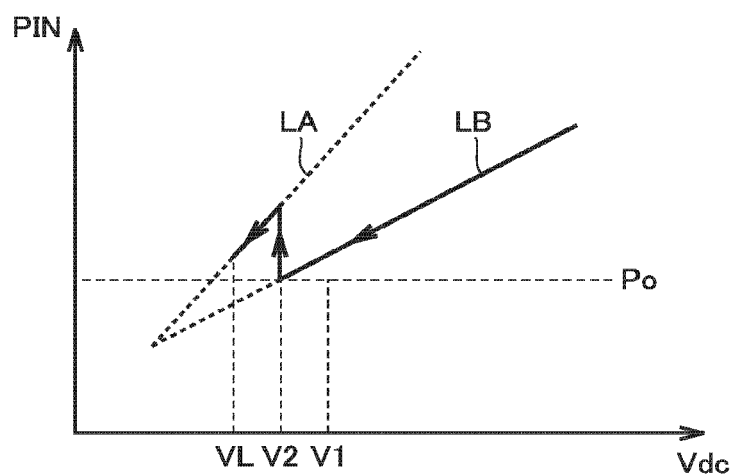
FIG. 9 is a diagram showing a change in supply power PIN as DC voltage Vdc falls in the first embodiment.

FIG. 8 is a diagram showing a change in supply power PIN as DC voltage Vdc rises in the first embodiment. FIG. 9 is a diagram showing a change in supply power PIN as DC voltage Vdc falls in the first embodiment. FIGS. 8 and 9 each show supply power PIN at the time when DC voltage Vdc is equal to or greater than lower limit voltage VL.

A straight line LA shows a value of supply power PIN with respect to DC voltage Vdc in the case where switch SW is turned on and the resistance value of current-limiting resistance circuit 80 becomes Ra. A straight line LB shows a value of supply power PIN with respect to DC voltage Vdc in the case where switch SW is turned off and the resistance value of current-limiting resistance circuit 80 becomes (Ra+Rb). In this case, V2 shows a value of DC voltage Vdc at the time when the value of supply power PIN on straight line LB becomes equal to the value of required power Po. In other words, the sum of the electric power required by control circuit 32 and the electric power consumed by power supply 50 is equal to supply power PIN supplied to control circuit 32 at DC voltage Vdc of V2 in the state where switch SW is off. V1 is set to be larger than V2.

Referring to FIG. 8, when DC voltage Vdc is less than V1, switch SW is on. Thus, the resistance value of current-limiting resistance circuit 80 is Ra. As a result, as DC voltage Vdc rises, supply power PIN increases along straight line LA.

When DC voltage Vdc rises to V1, switch SW is turned off. Thus, the resistance value of current-limiting resistance circuit 80 increases to (Ra+Rb). As a result, as DC voltage Vdc rises, supply power PIN increases along straight line LB. If supply power PIN changes along straight line LA even after DC voltage Vdc rises to V1, the difference between supply power PIN and required power Po increases, so that the surplus power increases. In the present embodiment, by changing supply power PIN along straight line LB when DC voltage Vdc rises to V1, the surplus power can be suppressed.

Referring to FIG. 9, when DC voltage Vdc exceeds V2, switch SW is off. Thus, the resistance value of current-limiting resistance circuit 80 is (Ra+Rb). As a result, as DC voltage Vdc falls, supply power PIN falls along straight line LB.

When DC voltage Vdc falls to V2, switch SW is turned on. Thus, the resistance value of current-limiting resistance circuit 80 falls to Ra. As a result, as DC voltage Vdc falls, supply power PIN decreases along straight line LA. If supply power PIN changes along straight line LB even after DC voltage Vdc falls to V2, supply power PIN falls below required power Po, so that electric power required for control circuit 32 cannot be supplied. In the present embodiment, by changing supply power PIN along straight line LA when DC voltage Vdc falls to V2, supply power PIN can be set to be equal to or greater than required power Po.

As described above, according to the present embodiment, by changing the resistance value of current-limiting resistance circuit 80 in accordance with the magnitude of DC voltage Vdc, power supply can be ensured at low DC voltage Vdc while power loss can be suppressed at high DC voltage Vdc.

Second Embodiment

Figure 10:
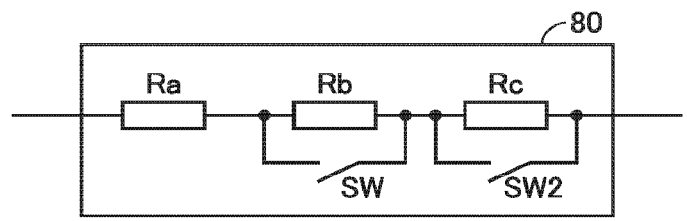
FIG. 10 is a diagram showing the configuration of a current-limiting resistance circuit 80 in the second embodiment.

FIG. 10 is a diagram showing the configuration of a current-limiting resistance circuit 80 in the second embodiment.

Current-limiting resistance circuit 80 includes resistances Ra, Rb, and Rc and a switch SW.

Resistances Ra, Rb, and Rc are connected in series on first DC line PL. Resistance Rb and switch SW are connected in parallel. Resistance Rc and switch SW2 are connected in parallel.

Switches SW and SW2 are controlled by resistance switching circuit 88. The resistance value of resistance Ra is defined as Ra. The resistance value of resistance Rb is defined as Rb. The resistance value of resistance Rc is defined as Rc. When switches SW and SW2 are on, the resistance of current-limiting resistance circuit 80 becomes Ra. When switch SW is off and switch SW2 is on, the resistance of current-limiting resistance circuit 80 becomes (Ra+Rb). When switches SW and SW2 are off, the resistance of current-limiting resistance circuit 80 becomes (Ra+Rb+Rc).

Figure 11:
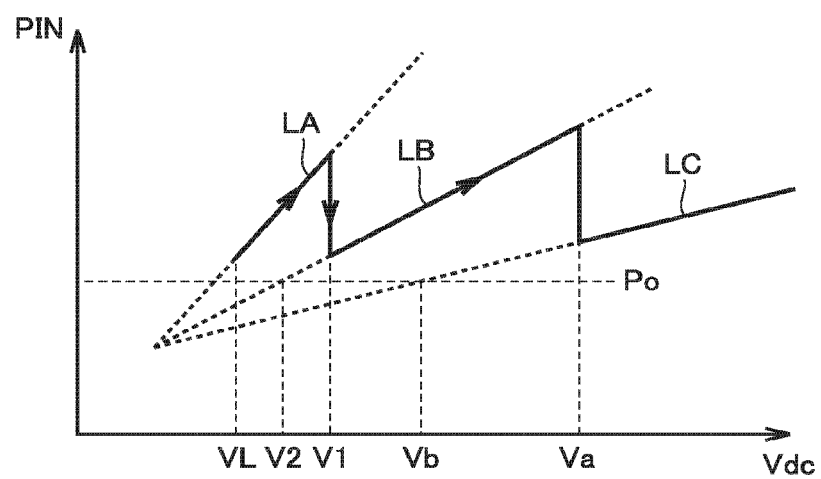
FIG. 11 is a diagram showing a change in supply power PIN as DC voltage Vdc rises in the second embodiment.
Figure 12:
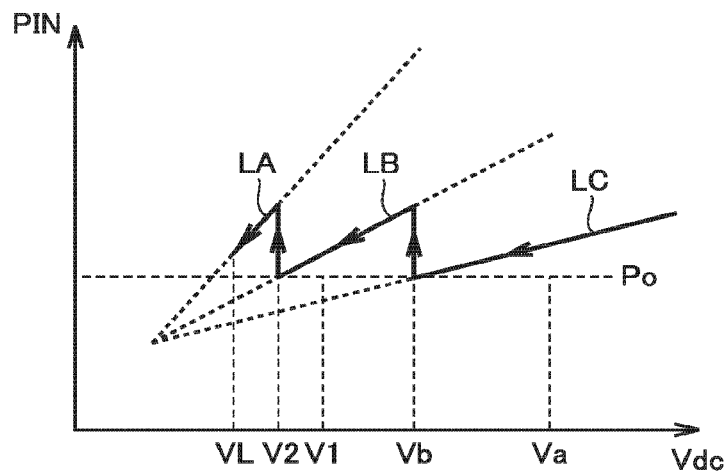
FIG. 12 is a diagram showing a change in supply power PIN as DC voltage Vdc falls in the second embodiment.

FIG. 11 is a diagram showing a change in supply power PIN as DC voltage Vdc rises in the second embodiment. FIG. 12 is a diagram showing a change in supply power PIN as DC voltage Vdc falls in the second embodiment. FIGS. 11 and 12 each show supply power PIN at the time when DC voltage Vdc is equal to or greater than lower limit voltage VL.

A straight line LA shows a value of supply power PIN with respect to DC voltage Vdc in the case where switches SW and SW2 are turned on and the resistance value of current-limiting resistance circuit 80 becomes Ra. A straight line LB shows a value of supply power PIN with respect to DC voltage Vdc in the case where switch SW is turned off, switch SW2 is turned on and the resistance value of current-limiting resistance circuit 80 is (Ra+Rb). A straight line LC shows a value of supply power PIN with respect to DC voltage Vdc in the case where switches SW and SW2 are turned off and the resistance value of current-limiting resistance circuit 80 is (Ra+Rb+RC).

In this case, V2 shows a value of DC voltage Vdc at the time when the value of supply power PIN on straight line LB becomes equal to the value of required power Po. In other words, the sum of the electric power required by control circuit 32 and the electric power consumed by power supply 50 is equal to supply power PIN supplied to control circuit 32 at DC voltage Vdc of V2 in the state where switch SW is off and switch SW2 is on. V1 is set to be larger than V2.

In this case, Vb shows a value of DC voltage Vdc at the time when the value of supply power PIN on straight line LC becomes equal to the value of required power Po. In other words, the sum of the electric power required by control circuit 32 and the electric power consumed by power supply 50 is equal to supply power PIN supplied to control circuit 32 at DC voltage Vdc of Vb in the state where switches SW and SW2 are off. Va is set to be larger than Vb.

Referring to FIG. 11, when DC voltage Vdc is less than V1, switches SW and SW2 are on. Thus, the resistance value of current-limiting resistance circuit 80 is Ra. As a result, as DC voltage Vdc rises, supply power PIN rises along straight line LA.

When DC voltage Vdc rises to V1, switch SW is turned off. Thus, the resistance value of current-limiting resistance circuit 80 increases to (Ra+Rb). As a result, as DC voltage Vdc rises, supply power PIN increases along straight line LB. If supply power PIN increases along straight line LA even after DC voltage Vdc rises to V1, the difference between supply power PIN and required power Po increases, so that the surplus power increases. In the present embodiment, by controlling supply power PIN to rise along straight line LB at the time when DC voltage Vdc rises to V1, surplus power can be suppressed.

Furthermore, when DC voltage Vdc rises to Va, switch SW2 is turned off. Thus, the resistance value of current-limiting resistance circuit 80 increases to (Ra+Rb+Rc). As a result, as DC voltage Vdc rises, supply power PIN increases along straight line LC. If supply power PIN increases along straight line LB even after DC voltage Vdc rises to Va, the difference between supply power PIN and required power Po increases, so that the surplus power increases. In the present embodiment, by controlling supply power PIN to increase along straight line LC at the time when DC voltage Vdc rises to Va, surplus power can be suppressed.

Referring to FIG. 12, when DC voltage Vdc exceeds Vb, switches SW and SW2 are off. Thus, the resistance value of current-limiting resistance circuit 80 is (Ra+Rb+Rc). As a result, as DC voltage Vdc falls, supply power PIN decreases along straight line LC.

When DC voltage Vdc falls to Vb, switch SW2 is turned on. Thus, the resistance value of current-limiting resistance circuit 80 decreases to (Ra+Rb). As a result, as DC voltage Vdc falls, supply power PIN decreases along straight line LB. If supply power PIN decreases along straight line LC even after DC voltage Vdc falls to Vb, supply power PIN becomes smaller than required power Po. Thus, electric power required for control circuit 32 cannot be supplied. In the present embodiment, by controlling supply power PIN to decrease along straight line LB at the time when DC voltage Vdc falls to Vb, supply power PIN can be set to be equal to or greater than required power Po.

Furthermore, when DC voltage Vdc falls to V2, switch SW is turned on. Thus, the resistance value of current-limiting resistance circuit 80 decreases to Ra. As a result, as DC voltage Vdc falls, supply power PIN decreases along straight line LA. If supply power PIN decreases along straight line LB even after DC voltage Vdc falls to V2, supply power PIN becomes smaller than required power Po. Thus, electric power required for control circuit 32 cannot be supplied. In the present embodiment, by controlling supply power PIN to decrease along straight line LA at the time when DC voltage Vdc falls to V2, supply power PIN can be set to be equal to or greater than required power Po.

As described above, according to the present embodiment, also by changing the resistance value of current-limiting resistance circuit 80 in two stages in accordance with the magnitude of DC voltage Vdc, power supply can be ensured at low DC voltage Vdc while power loss can be suppressed at high DC voltage Vdc, as in the first embodiment.

Third Embodiment

In the present embodiment, switch SW is switched based on a common voltage V2 as a threshold voltage between when DC voltage Vdc rises and when DC voltage Vdc falls.

Figure 13:
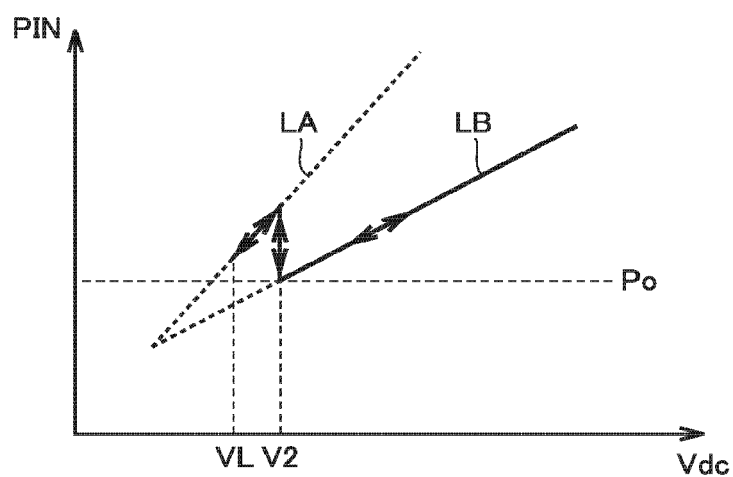
FIG. 13 is a diagram showing a change in supply power PIN as DC voltage Vdc rises and falls in the third embodiment.

FIG. 13 is a diagram showing a change in supply power PIN as DC voltage Vdc rises and falls in the third embodiment. FIG. 13 shows supply power PIN at the time when DC voltage Vdc is equal to or greater than lower limit voltage VL.

When DC voltage Vdc is less than V2, switch SW is on. Thus, the resistance value of current-limiting resistance circuit 80 is Ra. As a result, as DC voltage Vdc rises, supply power PIN increases along straight line LA.

When DC voltage Vdc rises to V2, switch SW is turned off. Thus, the resistance value of current-limiting resistance circuit 80 increases to (Ra+Rb). As a result, as DC voltage Vdc rises, supply power PIN increases along straight line LB. Thereby, surplus power can be suppressed as in the first embodiment.

When DC voltage Vdc exceeds V2, switch SW is off. Thus, the resistance value of current-limiting resistance circuit 80 is (Ra+Rb). As a result, as DC voltage Vdc falls, supply power PIN falls along straight line LB.

When DC voltage Vdc falls to V2, switch SW is turned on. Thus, the resistance value of current-limiting resistance circuit 80 decreases to Ra. As a result, as DC voltage Vdc falls, supply power PIN falls along straight line LA. Thereby, supply power PIN can be set to be equal to or greater than required power Po.

As described above, according to the present embodiment, also when common voltage V2 is used as a threshold voltage at which switch SW is switched between when DC voltage Vdc rises and when DC voltage Vdc falls, power supply can be ensured at low DC voltage Vdc while power loss can be suppressed at high DC voltage Vdc, as in the first embodiment.

Fourth Embodiment

In the first embodiment, DC voltage Vdc at which the value of supply power PIN becomes equal to the value of required power Po during a fall of DC voltage Vdc is set as threshold value V2 that is defined as a point at which switch SW is switched during a fall of DC voltage Vdc. Also, in order to cause hysteresis to occur, the point at which switch SW is switched during a rise in DC voltage Vdc is set as V1 larger than V2. Hysteresis can prevent frequent occurrence of unnecessary switching.

At threshold value V2, switch SW is switched while DC voltage Vdc falls. In the present embodiment, this threshold value V2 is set at a value larger than the value of DC voltage Vdc at the time when supply power PIN becomes equal to required power Po while DC voltage Vdc falls.

Figure 14:
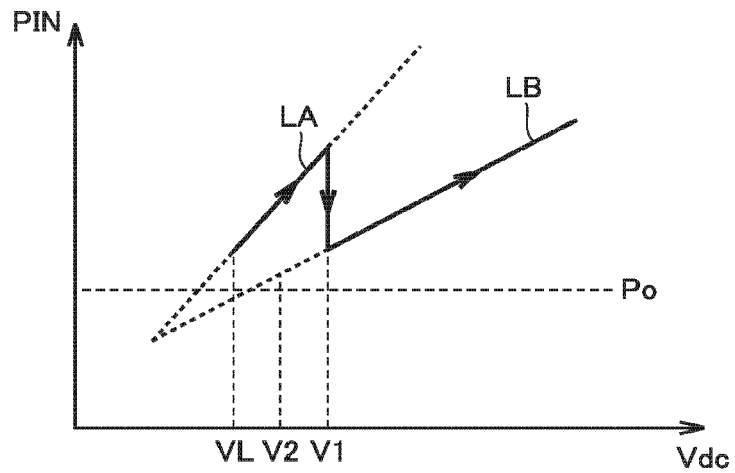
FIG. 14 is a diagram showing a change in supply power PIN as DC voltage Vdc rises in the fourth embodiment.
Figure 15:
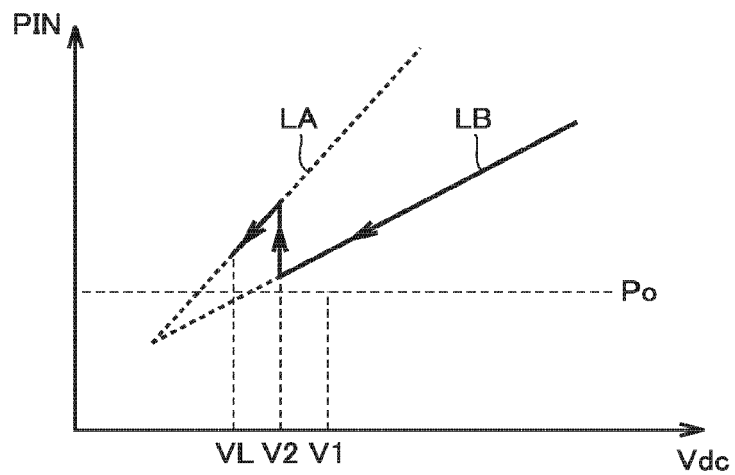
FIG. 15 is a diagram showing a change in supply power PIN as DC voltage Vdc falls in the fourth embodiment.

FIG. 14 is a diagram showing a change in supply power PIN as DC voltage Vdc rises in the fourth embodiment. FIG. 15 is a diagram showing a change in supply power PIN as DC voltage Vdc falls in the fourth embodiment. FIGS. 14 and 15 each show supply power PIN at the time when DC voltage Vdc is equal to or greater than lower limit voltage VL.

A straight line LA shows a value of supply power PIN with respect to DC voltage Vdc in the case where the resistance value of current-limiting resistance circuit 80 is Ra. A straight line LB shows a value of supply power PIN with respect to DC voltage Vdc in the case where the resistance value of current-limiting resistance circuit 80 is (Ra+Rb). The value of DC voltage Vdc at the time when the value of supply power PIN on straight line LB becomes equal to the value of required power Po is smaller than V2 as a point at which the switch is switched. V1 is set to be larger than V2.

As described above, according to the present embodiment, power supply can be ensured at low DC voltage Vdc while power loss can be suppressed at high DC voltage Vdc, as in the first embodiment.

In the above description in the first to fourth embodiments, a main circuit is formed of a full bridge circuit, but the present invention is not limited thereto. A main circuit may be formed of a half bridge circuit.

It should be understood that the embodiments disclosed herein are illustrative and non-restrictive in every respect. The scope of the present invention is defined by the terms of the claims, rather than the description above, and is intended to include any modifications within the meaning and scope equivalent to the terms of the claims.

REFERENCE SIGNS LIST 1 electric power system, 1u, 1v, 1w power transmission line, 2, 3 transformer, 4 controller, 5 unit converter, 5a first terminal, 5b second terminal, 11 to 14 switching element, 15, 51 capacitor, 18 exciting coil, 30 main circuit, 32 control circuit, 40, 42 drive circuit, 44 switch operation circuit, 46, 52 voltage sensor, 48 I/F circuit, 50 power supply, 53 overcharge suppression control circuit, 54 overcharge suppression circuit, 55 activation/deactivation circuit, 56 power supply circuit, 500 control unit, 501, 502 input terminal, 80 current-limiting resistance circuit, 82 AND circuit, 83 voltage detection circuit, 88 resistance switching circuit, 90 control power supply, A1 to A3 arm, C1 to C3 current transformer, D1 to D4 diode, Iuv, Ivw, Iwu AC current, L1 to L3 reactor, NL, PL DC line, R1 to R3 current-limiting resistor, R5, Ra, Rb, Rc resistance, S1 to S8, SW, SW2 switch, UL, VL, WL AL line.

The invention claimed is:
1. A power conversion device comprising:
a power converter including an arm that is formed of a series connection of a plurality of unit converters; and
a controller that controls the power converter, wherein
each of the unit converters includes
a main circuit including a plurality of switching elements and a first capacitor that is electrically connected between a first DC line and a second DC line, a control circuit that controls the switching elements according to a control signal received from the controller, a power supply that lowers a voltage of the first capacitor to generate a power supply voltage and supplies the power supply voltage to the control circuit, and a current-limiting resistance circuit having a resistance value that is variable, the current-limiting resistance circuit being disposed between the main circuit and the power supply, the power supply includes
- a second capacitor electrically connected between the first DC line and the second DC line,
- an overcharge suppression circuit electrically connected between the first DC line and the second DC line,
- a power supply circuit that converts a voltage of the second capacitor into the power supply voltage, the power supply circuit being electrically connected between the first DC line and the second DC line, and
- a control unit, and the control unit includes
- an overcharge suppression control circuit that controls the overcharge suppression circuit in accordance with a magnitude of the voltage of the second capacitor, and
- a resistance switching circuit that changes the resistance value of the current-limiting resistance circuit in accordance with a magnitude of the voltage of the first capacitor.

2. The power conversion device according to claim 1, wherein
the current-limiting resistance circuit includes
- a first resistance element and a second resistance element connected in series to each other, and
- a switch connected in parallel to the second resistance element, and the resistance switching circuit sets the switch to be turned on or off in accordance with the magnitude of the voltage of the first capacitor.

3. The power conversion device according to claim 2, wherein
in a case where the voltage of the first capacitor rises in a state where the switch is on, the resistance switching circuit turns off the switch when the voltage of the first capacitor becomes equal to or greater than a first threshold value, in a case where the voltage of the first capacitor falls in a state where the switch is off, the resistance switching circuit turns on the switch when the voltage of the first capacitor becomes equal to or less than a second threshold value, and the first threshold value is equal to or different from the second threshold value.

4. The power conversion device according to claim 3, wherein the second threshold value is smaller than the first threshold value.

5. The power conversion device according to claim 4, wherein a magnitude of the second threshold value is equal to the voltage of the first capacitor at which a sum of electric power required by the control circuit and electric power consumed by the power supply is equal to electric power supplied to the control circuit in a state where the switch is off.

6. The power conversion device according to claim 3, wherein magnitudes of the first threshold value and the second threshold value each range between a control target voltage of the first capacitor and an initial stable voltage at which the voltage of the first capacitor is stabilized after the power conversion device is activated and before the switching elements perform switching operations.

7. The power conversion device according to claim 3, wherein magnitudes of the first threshold value and the second threshold value each are equal to or greater than a value of the voltage of the first capacitor at which a sum of electric power required by the control circuit and electric power consumed by the power supply is equal to electric power supplied to the control circuit in a state where the switch is off.

8. The power conversion device according to claim 3, wherein the switch is off until the voltage of the first capacitor becomes equal to or greater than a predetermined value after the power conversion device is activated.

9. The power conversion device according to claim 8, wherein
when the voltage of the first capacitor reaches the predetermined value after the power conversion device is activated, a control power supply for causing the power supply to function is activated and the switch is turned on.

* * * * *